(12) United States Patent
Lai et al.

(10) Patent No.: US 6,342,837 B1
(45) Date of Patent: Jan. 29, 2002

(54) OBJECT IDENTIFICATION STRUCTURE APPLICABLE FOR IDENTIFICATION, PRODUCTION CONTROL, AND DATA RETRIEVAL

(76) Inventors: Chun Pen Lai; Paul Y. Liau, both of P.O. Box 63-150, Taichung City (406) (TW)

( * ) Notice: Subject to any disclaimer, the term of this patent is extended or adjusted under 35 U.S.C. 154(b) by 0 days.

(21) Appl. No.: 09/620,677

(22) Filed: Jul. 20, 2000

(51) Int. Cl.[7] ............................................. G08B 13/14
(52) U.S. Cl. ........................ 340/572.1; 340/568.1; 340/10.41; 340/825.35; 340/825.54
(58) Field of Search ........................... 340/572.1, 568.1, 340/10.41, 825.35, 825.54

(56) References Cited

U.S. PATENT DOCUMENTS

| | | | |
|---|---|---|---|
| 5,629,981 A | * | 5/1997 | Nerlikar ................ 340/825.34 |
| 6,107,920 A | * | 6/1998 | Eberthardt et al. ...... 340/572.7 |
| 6,045,652 A | * | 7/1998 | Tuttle et al. ........... 340/825.54 |
| 5,936,527 A | * | 8/1999 | Isaacman et al. ........ 340/572.1 |
| 6,078,251 A | * | 6/2000 | Landt et al. ............. 340/10.41 |
| 6,119,229 A | * | 9/2000 | Martinez et al. ............ 713/200 |

* cited by examiner

*Primary Examiner*—Nina Tong
*Assistant Examiner*—Hung Nguyen

(57) ABSTRACT

This utility model provides an object identification structure applicable for authentication, production control, and data retrieval, and such structure comprising an object with a printed page to be identified; and its feature is that there is a Radio Frequency Identification Integrated Circuit RFIDIC deposed at the appropriate position on the front printed page, and said RFIDIC further comprising a storage device for storing user's (or storing account) identification code, password, serial number and the like, working with a computer terminal connected to a set of wireless code reader interfaced with RS232 or RS485 for detection. Such arrangement can improve the control of the manufacturing procedure and attain the identification purpose.

1 Claim, 3 Drawing Sheets

OBJECT IDENTIFICATION STRUCTURE APPLICABLE FOR IDENTIFICATION, PRODUCTION CONTROL, AND DATA RETRIEVAL

BACKGROUND OF THE INVENTION

1. Field of the Invention

The present utility model invention relates to an identification device, more particularly to an object identification structure applicable for identification, production control, and data retrieval.

2. Description of the Prior Art

All kinds of conventional identification systems are using an identification method by labeling the object to be tested with a bar code sticker, and then decoding the bar code by a code reader. Since the bar code sticker is not of high heat resistible, and easy to peel off or easy to copy, therefore regardless of applying it to the manufactured products in the control of production procedure or in the identification process of the data retrieval system, there exists many uncertain factors in the identification process and bottlenecks or shortcomings of the inefficient operation.

In view of the above description, the inventor of the present utility model invention based on years of experience in the related industry conducted extensive research to enhance the identification system herein which is hereby submitted for patent application.

Therefore, the primary objective of the utility model invention is to provide an object identification structure applicable for identification, production management, and data retrieval, and to effectively improve the control of the production procedure, and to identify objects from counterfeits.

The present utility model provides an object identification structure applicable for authentication, production control, and data retrieval and such structure is high heat resistant, uneasy-to-fall-off, and copy protective, in order to attain the purposes of improving the production control and protecting from counterfeits. The present utility model invention comprises an object with a printed page to be identified; and its feature is that there is a Radio Frequency Identification Integrated Circuit RFIDIC deposed at the appropriate position on the front printed page, and said RFIDIC further comprising a storage device for storing user's (or storing account) identification code, password, serial number and the like, working with a computer terminal connected to a set of wireless code reader interfaced with RS232 or RS485 for detection. Such arrangement can improve the control of the manufacturing procedure and attain the identification purpose.

To make it easier for our examiner to understand the objective of the utility model invention, its performance and advantages, we use a preferred embodiment together with the attached drawings for the detailed description of the utility model invention.

BRIEF DESCRIPTION OF THE DRAWINGS

Other objects, features, and advantages of the utility model invention will become apparent from the following detailed description of the preferred but non-limiting embodiment. The description is made with reference to the accompanying drawings, in which.

Attachment I lists the features of the Radio Frequency Identification Integrated Circuit (RFIDIC) of the present utility model invention.

DESCRIPTION OF THE PREFERRED EMBODIMENT

Figure 1:
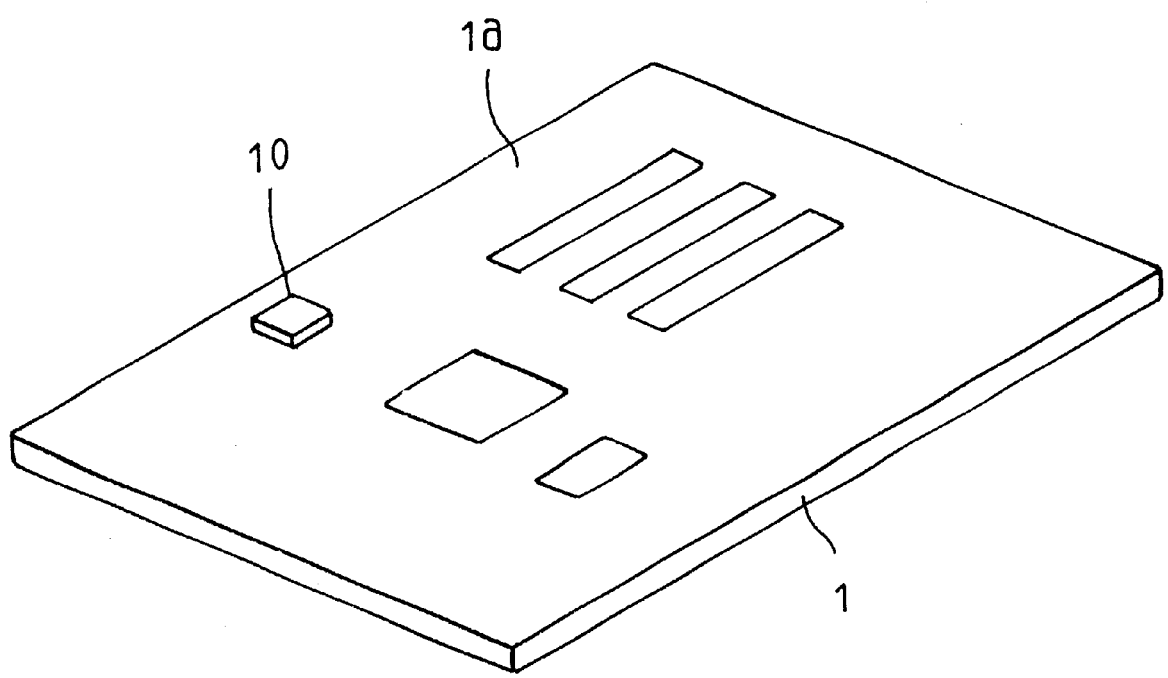
FIG. 1 shows the three-dimensional illustrative diagram of a preferred embodiment of the present utility model invention.
Figure 2:
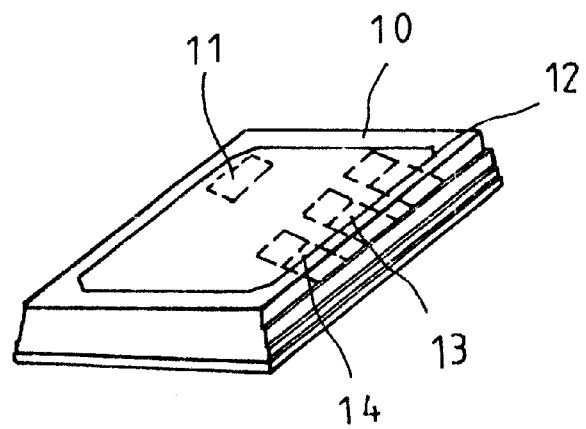
FIG.2 shows the three-dimensional diagram of a Radio Frequency Identification Integrated Circuit of the present utility model invention.

As shown in FIG. 1, the present utility model invention of an object identification structure mainly has an identification structure, mainly comprising an object 1 to be identified, together with a set of computer terminal 2, a set of RS232 or RS485 interface 3, and a set of wireless code reader 4; wherein said object 1 as shown in FIG. 1, having a Radio Frequency Identification Integrated Circuit, RFIDIC 10 deposed at an appropriate position of the front of a printed page (1a), and said Radio Frequency Identification Integrated Circuit, RFIDIC 10 shown in FIG. 2 further comprising a storage device 11 for storing user's identification code, password, serial number, etc.; said RFIDIC 10 comprising a server address 12, an identification code 13 and an authentication program 14; and the property, size, detailed information of said Radio Frequency Identification Integrated Circuit, RFIDIC 10 are shown in the tables and graphs of the Attachment I.

Figure 3:
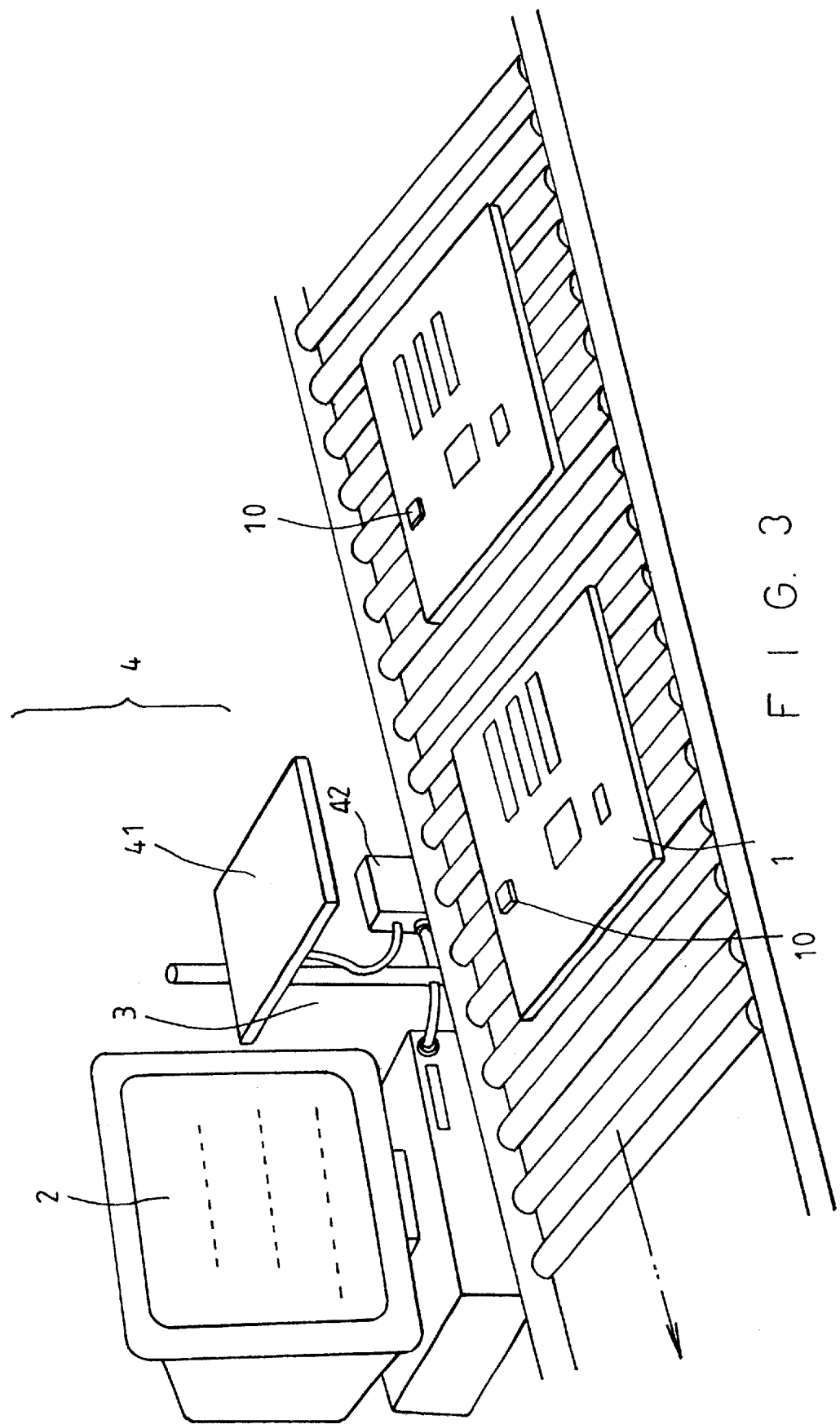
FIG. 3 shows the three-diagram of the application for the identification of production control according to the present utility model invention.
Figure 4:
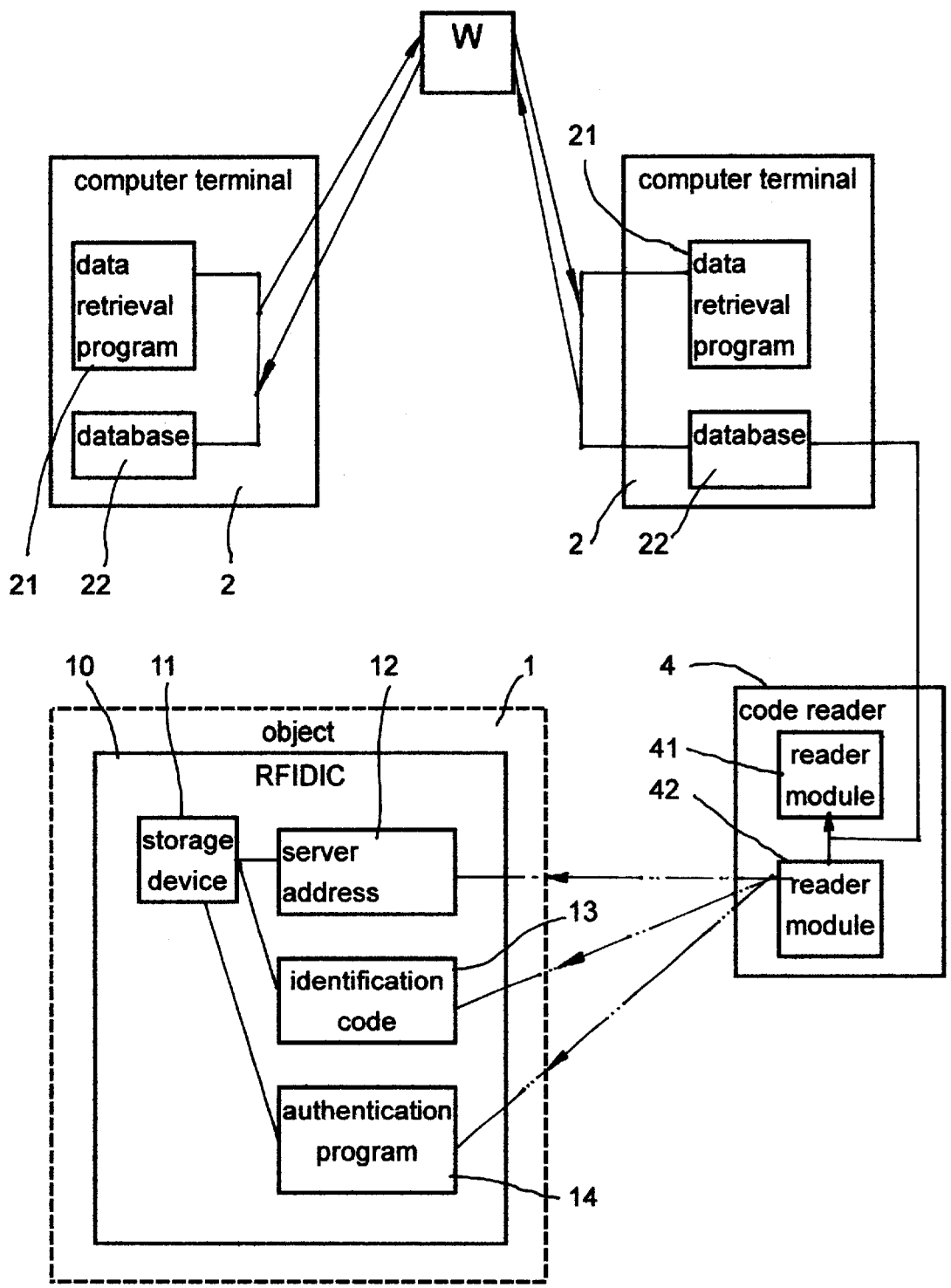
FIG. 4 shows the illustrative block diagram of the application for the data retrieval and identification procedure according to the present utility model invention.

In FIGS. 3 and 4, such computer terminal 2 has a data retrieval program 21 and a database 22; wherein such data retrieval program 21 and database 22 is a programmable database, and after such data retrieval program 21 and database 22 are distributed to a user, the provider will give the user a unique code via Internet.

Said interface 3 as shown in FIG. 3 incorporates the RS232 or RS485 interface for the connection with said computer terminal 2 and said wireless code reader 4. Said wireless code reader 4 as shown in FIG. 4 comprises an antenna for reader module 41 and a reader module 42; and these two modules can be composed of a single unit.

By the foregoing combination, the present utility model invention is capable of being high temperature resistant, uneasy-to-peel-off, and copy protective and attains the purpose of improving the manufacturing quality control and preventing counterfeits. Since the RFIDIC 10 is packaged in an object 1 waiting to be identified or controlled in the production process, its security is unquestionable, not only can prevent falling off, counterfeiting, but also can stand high heat. According to the test sample sent by the applicant to Compeq Manufacturing Company for testing, the "acid and alkaline resistance test" shows that there is no abnormal situations such as color change, erosion, and separation after such sample is dipped in hydrochloric acid (HCL, 10%) and sulfuric acid ($H_2SO_4$, 10%) for 10 minutes. It is sufficient to show that the present utility model invention has excellent effects on the prevention of falling offs and high heat resistance. Therefore, it achieves the best results in production control and identification effect in the control of the whole PCB manufacturing procedure.

Meanwhile, the RS232 data retrieval program and the database is a programmable database, after such data retrieval program and such database is delivered to the users, the provider can give a unique code to the user via Internet. Such arrangement can ensure the effective identification. In compliance with the usage of a terminal, the RFIDIC 10 comprises a storage means for storing the user's ID (identification code and serial number), and also a server address 12, an identification code 13, and an authentication program 14. It can prevent counterfeit and control production process; so that the users can easily and conveniently hook up to the Internet via any one of the several terminal having code readers. It is very convenient and its IC contains the identification password for security and anti-counterfeiting.

In summation of the above description, the present utility model invention of an object identification structure for identification, production control, and data retrieval herein enhances the conventional structure and further complies with the patent application requirements and is submitted to the Patent and Trademark Office for review and granting of the commensurate patent rights.

While the utility model invention has been described by way of example and in terms of a preferred embodiment, it is to be understood that the utility model invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An object identification structure for authentication, production control, and data retrieval, comprising an object to be identified, and said object with a printed page and its feature being that there is a Radio Frequency Identification Integrated Circuit RFIDIC deposed at an appropriate position on the front printed page, said RFIDIC comprising a storage device for storing a user's (or storing account) identification code, password, and serial number, working with a computer terminal connected to a set of wireless code reader interfaced with RS232 or RS485 serial port for detection, and thereby the structure improves the control of the manufacturing procedure and attains the identification purpose;

wherein said RFIDIC further comprises a server address, identification code, and an authentication program.

* * * * *